ly appear and which are inherently possessed by our invention.

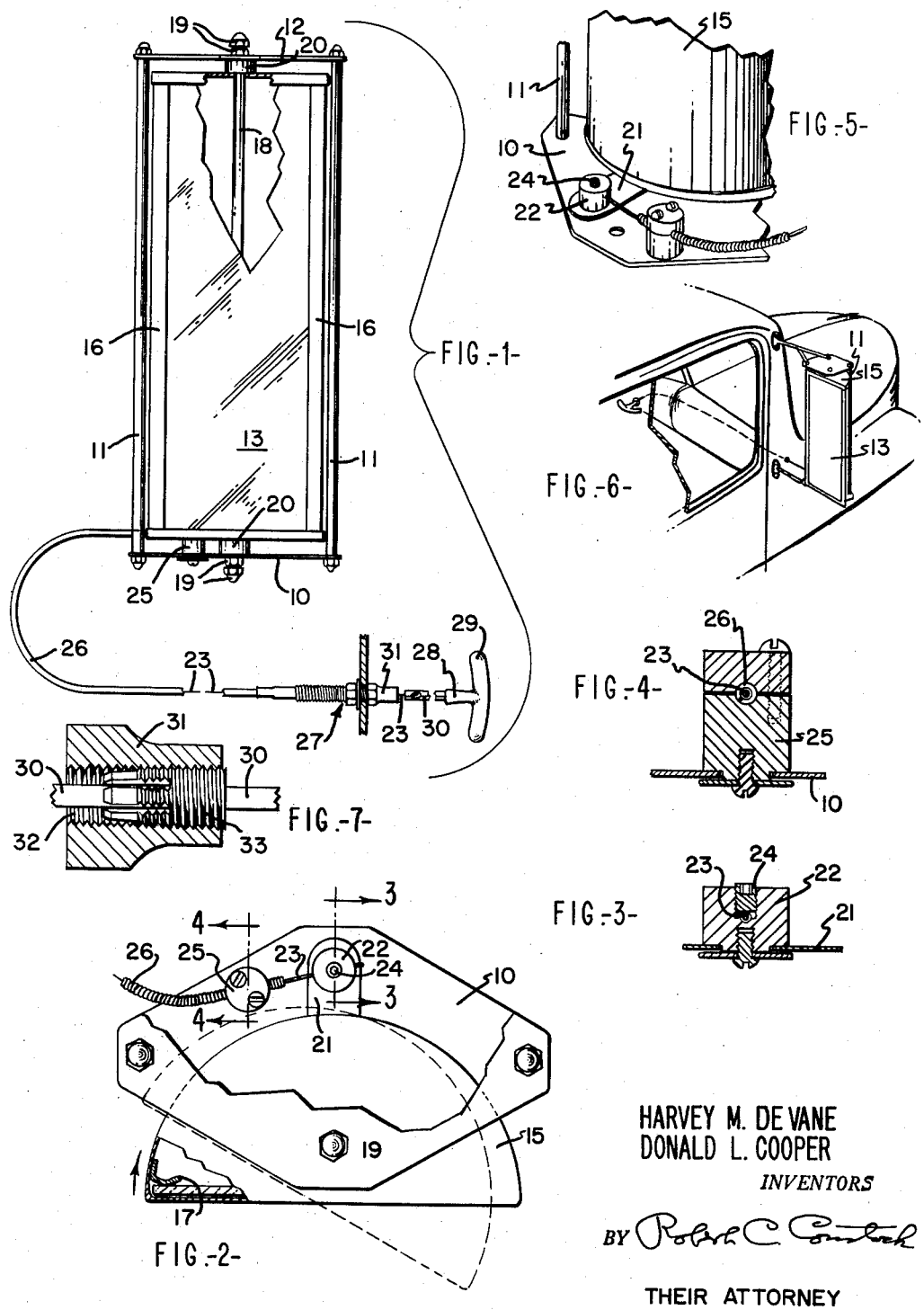

United States Patent Office 2,843,018
Patented July 15, 1958

2,843,018

ADJUSTABLE REAR VIEW MIRROR FOR TRUCKS

Donald L. Cooper, North Las Vegas, Nev., and Harvey M. De Vane, Oxnard, Calif.

Application December 19, 1955, Serial No. 553,758

5 Claims. (Cl. 88—98)

This invention relates to a rear view mirror for automotive vehicles, particularly trucks, and to such a mirror which is mounted on the outside of the truck, but the angle of vision of which is adjustable from the inside of the cab of the truck. The present application relates to an improvement of the structure disclosed in the co-pending application of Donald L. Cooper, Serial No. 534,905, now abandoned.

At the present time most trucks have one or more rear view mirrors, the positioning of which is substantially fixed. The mirrors are usually disposed out of reach of the driver, particularly if they are located on the fenders or at the opposite side of the cab from the driver. The result is that while a driver may be able to see the area directly behind his truck, he cannot see those areas which are to either side thereof. It often occurs that these areas become important to the driver as a source of potential danger or difficulty. In the case of a Y-junction or diagonal crossroad, for example, it may be important for the driver to see such areas, particularly before moving onto a road on which fast moving traffic may be approaching from such an angle.

It is an object of our invention to overcome these and other similar rear view mirror difficulties encountered by truck drivers by providing a mirror which is capable of being mounted substantially any place on the truck, and which is adjustable from inside the cab of the truck.

It is more particularly an object of our invention to provide such a device in which a substantial range of adjustment can be accomplished without the driver leaving his seat behind the steering wheel of the truck, so that substantially any normally blind area can be made visible to the driver.

It is a further object of our invention to provide, in combination with a mirror which may be moved to substantially any position desired, locking means whereby the mirror may be held in such position.

It is also among the objects of our invention to provide such a mirror which is strong and durable in construction, so that it will stand up under heavy and prolonged wear, and which is also simple and economical in construction and use, so that it will be acceptable for and capable of widespread use. Our mirror is universal in the sense that it is capable of use on a large number of trucks and similar vehicles and can be used in substantially any position on the vehicle.

It is another object of our invention to provide improved and simplified control means for moving the mirror, and particularly to provide push-pull control means operable from the dashboard of the automobile. The preferred form of our control means utilizes a control cable with a pair of floating pivot members to provide smooth operation at all times.

Our invention also comprises such other objects, advantages and capabilities as will later more fully appear and which are inherently possessed by our invention.

While we have shown in the accompanying drawings a preferred embodiment of our invention, it should be understood that the same is susceptible of modification and change without departing from the spirit of our invention.

Referring to the drawings, Fig. 1 is a front elevational view of our adjustable rear view mirror for trucks, with a portion broken away to show the interior structure;

Fig. 2 is a top plan view of the same, a portion being broken away to show the base structure, with movement of the mirror being indicated in dotted lines;

Fig. 3 is a sectional view taken on line 3—3 of Fig. 2;

Fig. 4 is a sectional view taken on line 4—4 of Fig. 2;

Fig. 5 is a broken perspective view of the control structure on the mirror base;

Fig. 6 is a perspective view of the device in use.

Fig. 7 is an enlarged sectional view showing the locking collet.

A preferred embodiment which has been selected to illustrate our invention comprises a substantially diamond-shaped base 10, which is preferably formed of flat sheet metal. A pair of upright members 11 are attached at their bottom ends to the opposite ends of base 10 and extend upwardly at a right angle therefrom. A top 12, which is substantially identical to the base 10, is bolted to the upper ends of the upright member 11. A rectangular mirror 13 is mounted adjacent the front of a semi-cylindrical mirror housing 15. The front of the mirror housing 15 is provided with a pair of inwardly directed front flanges 16. A pair of mirror mounting brackets 17 are attached to the opposite sides of the mirror housing 15 directly behind the flanges 16. The mounting brackets 17 extend for the full length of the mirror housing 15 and are provided with a free portion which is adapted to bear against the back of the mirror 13 and hold it resiliently in place against the flanges 16.

The back of the mirror housing 15 is rounded so that the force of moving air when the vehicle is in motion will not act to turn the mirror away from the position in which it is set. The air will move smoothly around the mirror housing 15, without causing it to move in one direction or the other.

An elongated pivot rod 18 extends longitudinally from the base 10 to the top 12 and is fixedly attached to the top and bottom closed ends of the mirror housing 15. The ends of the pivot rod 18 extend through the base 10 and top 12 adjacent the front thereof and are screw-threaded to receive a pair of nuts 19 on each end thereof. The pivot rod 18 thus provides a pivotal mounting for the mirror housing 15 and mirror 13.

A pair of cylindrical spacers 20 are mounted between the base 10 and top 12 and the top and bottom of the mirror housing 15. The nuts 19 are preferably adjusted so that the rotational movement of the mirror housing 15 takes place with respect to the spacers 20, which preferably remain substantially stationary.

Extending outwardly from the bottom of the mirror housing 15 and preferably formed integrally therewith is an arm 21. Pivotally mounted adjacent the end of the arm 21 is an anchor member 22. As shown in Fig. 3 of the drawings, the anchor member 22 has a base which extends into a slightly larger opening in the arm 21. A screw extends upwardly through a washer into the center of the anchor member 22, which is thus freely pivotable with respect to the arm 21. The anchor member 22 is provided with a transverse slot, through which the end of a control wire 23 is removably mounted. A set screw 24 extends downwardly through the top of the anchor member 22, so that its end engages the control wire 23 to attach it to the anchor member 22.

Extending upwardly from the base 10 is a cylindrical tubing terminal 25, which comprises upper and lower parts held together by a pair of screws, as shown in Figs. 2, 4 and 5. The tubing terminal 25 is pivotally mounted with respect to the base 10 in the same manner as the anchor member 22. The upper and lower parts of the tubing terminal 25 are provided with complementary semi-cylindrical grooves which combine to form a cylindrical passage which is adapted to removably receive the end of a length of flexible hollow tubing 26, which houses the control wire 23.

The control wire 23 and tubing 26 extend from the terminal points described to the cab of the vehicle, where they terminate in a manual control assembly 27. The control assembly 27 includes a portion which is externally screwthreaded and which is adapted to extend through an opening in the dashboard of the vehicle, with fastening members being provided on both sides of the dashboard to hold the control assembly 27 in position.

A manually operable control plunger 28 is provided at one end thereof with a manually graspable handle 29 and at its opposite end with a square shank 30, to the end of which is attached the opposite end of the control wire 23. The end of the flexible tubing 26 is fixedly attached to the manual control assembly 27.

The control plunger 28 is mounted for reciprocal push-pull movement toward and away from the dashboard of the vehicle, moving the control wire 23 within the flexible tubing 26. Movement of the control wire 23 results in movement of the anchor member 22 to which it is attached, causing the arm 21 to move. This pivots the mirror housing 15, causing the mirror 13 to change its direction.

It will be noted that as the arm 21 moves, the angle of the control wire 23 and tubing 26 necessarily changes. In order to provide easy movement, the anchor member 22 and tubing terminal 25 are both floating pivots, which are pivoted in response to a change in the direction of the control wire 23 and tubing 26. In this way there is no binding at any time.

In order to permit the mirror 13 to be held in any desired position, a nut 31 which comprises part of the manual control assembly 27 is provided with a central passage 32 through which the square shank 30 of the plunger 28 movably extends. The inside of the passage 32 is provided with internal screwthreading. A collet 33, which is provided with complementary external screwthreading, is mounted within the passage 32. The collet 33 has a square central passage which fits around the square shank 30, so that the collet 33 turns whenever the shank 30 is rotated.

The end of the collet 33 remote from the plunger 28 is split, as shown in Fig. 7, so as to be compressible into engagement with the square shank 30. The passage 32 is slightly tapered toward the end thereof remote from the plunger 28 so that as the shank 30 is rotated to move the collet 33 further into the passage 32, the split end of the collet 33 is compressed into tight engagement with the shank 30 to prevent its further movement.

It is thus possible for the driver to move the mirror 13 to any desired position by reciprocal movement of the plunger 28 and then to lock the mirror 13 in such position by rotating the plunger 28 until the locking action described takes place. The mirror 13 will then remain in such position until it is released by rotation of the plunger 28 in the opposite direction and by reciprocal movement of the plunger 28.

In use, the entire mirror assembly can be attached at any desired position on the vehicle. The base 10 and top 12 are preferably provided with openings for attachment to a suitable mounting bracket, which is in turn attached to the vehicle.

The upright members 11, in addition to providing part of the mounting for the mirror 13, also act to prevent tree branches or other objects from turning the mirror 13 or damaging it.

We claim:

1. A device for controlling the positioning of the rear view mirror of a vehicle from the cab of the vehicle, said mirror being mounted in a housing, said housing being pivotally mounted on a base, said control device including an arm attached at one end to said mirror housing and extending outwardly therefrom, said arm having a circular opening adjacent the end thereof remote from said mirror housing, an anchor member, said anchor member having at the bottom thereof a short end portion of smaller circular diameter than the adjacent portion of said anchor member, said end portion extending through the opening in said arm, a washer disposed beneath said arm, a fastening member extending from beneath said washer into the center of the end portion of said anchor member, the portion of said arm surrounding said opening being disposed between said washer and the portion of said anchor member above said end portion, said anchor member being rotatable on its vertical axis with respect to said arm by the rotation of said end portion within said opening, a control wire attached at one end to said anchor member, a flexible tubing surrounding said control wire, a tubing terminal mounted on said base adjacent but spaced from said anchor member, the end of said flexible tubing being attached to said tubing terminal, said tubing terminal being mounted for rotation about its vertical axis, said wire adapted to be reciprocally moved from the cab of the vehicle to cause the pivotal movement of said mirror housing and mirror, said tubing terminal and anchor member being adapted to rotate about their vertical axes in response to variations in the relative positioning of said anchor member and tubing terminal during the pivotal movement of said mirror housing.

2. A control device as described in claim 1, and control means attached to the opposite end of said control wire to control the movement of said mirror from the cab of said vehicle, said control means including a reciprocable and rotatable plunger having a non-round shank, a nut having an internally screw threaded tapered passage, a collet screw threadedly mounted within said passage, said collet having a non-round opening adapted to receive said shank so that said collet is not moved by reciprocal movement of said shank, but rotates with rotary movement of said shank, said collet having a split end adapted to be pressed into locking engagement with said shank upon rotary movement of said collet toward the narrower end of said tapered passage, said plunger adapted to control the position of said mirror housing by reciprocal movement of said plunger, said plunger adapted upon rotation thereof to lock said mirror housing in any desired position.

3. A control device as described in claim 1, said base having a circular opening therein disposed adjacent the rear of said mirror housing, the bottom of said tubing terminal having a short end portion of smaller circular diameter than the adjacent portion of said tubing terminal, said end portion extending through the opening in said base, a washer disposed beneath said base, a fastening member extending from beneath said washer into the center of the end portion of said tubing terminal, the portion of said base surrounding said opening being disposed between said washer and the portion of said tubing terminal adjacent said end portion, said tubing terminal being rotatable on its vertical axis with respect to said base by the rotation of said end portion thereof within the opening in said base.

4. A control device as described in claim 3, said tubing terminal comprising an upper portion and a lower portion, fastening means for holding said portions together, the bottom of said upper portion having a downwardly directed groove of semi-circular cross section extending diametrically thereacross, the top of said lower portion having an upwardly directed groove of semi-circular cross section extending diametrically thereacross, said grooves being complementary to each other to form a cylindrical passage, the end of said flexible tubing extending into and being frictionally held within said passage.

5. A control device as described in claim 3, said anchor member having a laterally directed transverse slot and a downwardly directed opening intersecting said slot, said downwardly directed opening being screw threaded, a set screw threadably mounted in said opening, the end of said control wire extending into said slot and being securely held therein between the bottom of said set screw and the bottom of said slot.

References Cited in the file of this patent

UNITED STATES PATENTS

| | | |
|---|---|---|
| 1,688,214 | Walden | Oct. 16, 1928 |
| 2,319,041 | Crouse | May 11, 1943 |
| 2,330,444 | Park | Sept. 28, 1943 |
| 2,585,399 | Mead | Feb. 12, 1952 |
| 2,614,437 | Meggitt | Oct. 21, 1952 |
| 2,626,539 | Peterson | Jan. 27, 1953 |
| 2,708,086 | Prutzman | May 10, 1955 |
| 2,734,997 | Frady | Feb. 14, 1956 |

FOREIGN PATENTS

| | | |
|---|---|---|
| 450,982 | Italy | Aug. 19, 1949 |